United States Patent [19]
Yui et al.

[11] Patent Number: 5,463,708
[45] Date of Patent: Oct. 31, 1995

[54] OPTICAL WAVEGUIDE MODULE HAVING A WAVEGUIDE AFFIXED THERETO AT A FIRST BONDING STRENGTH AND OPTICAL FIBERS AFFIXED THERETO AT A SECOND BONDING STRENGTH

[75] Inventors: Dai Yui; Hiroshi Suganuma; Shinji Ishikawa; Shigeru Semura, all of Yokohama, Japan

[73] Assignee: Sumitomo Electric Industries, Ltd., Osaka, Japan

[21] Appl. No.: 264,357

[22] Filed: Jun. 22, 1994

[30] Foreign Application Priority Data

Jun. 22, 1993 [JP] Japan .................................. 5-150739

[51] Int. Cl.⁶ .............................. G02B 6/00; G02B 6/36
[52] U.S. Cl. ................................................... 385/49
[58] Field of Search ........................... 385/49, 31, 33, 385/15, 50, 52

[56] References Cited

U.S. PATENT DOCUMENTS

| | | | |
|---|---|---|---|
| 4,948,219 | 8/1990 | Seino et al. ................................. | 385/49 |
| 4,984,866 | 1/1991 | Boisgontier et al. ....................... | 385/49 |
| 5,091,986 | 2/1992 | Arii et al. ................................. | 385/49 X |
| 5,113,460 | 5/1992 | Hakoun et al. ............................ | 385/39 |
| 5,343,544 | 8/1994 | Boyd et al. ............................... | 385/49 X |
| 5,361,382 | 11/1994 | Nakamura et al. ....................... | 385/49 |

FOREIGN PATENT DOCUMENTS

| | | |
|---|---|---|
| 0283301 | 9/1988 | European Pat. Off. . |
| 0331332 | 9/1989 | European Pat. Off. . |
| 0456026 | 11/1991 | European Pat. Off. . |

OTHER PUBLICATIONS

Patent Abstracts of Japan, vol. 14, No. 264 (P–1057) Jun. 7, 1990 & JP–A–02 073 207 (NTT) *abstract*.
Patent Abstracts of Japan, vol. 10, No. 260 (P–494) Sep. 5, 1986 & JP–A–61 086 705 (Matsushita Electric) *abstract*.
Mekada et al, "Practical Method of Waveguide–to–Fiber Connection: Direct Preparation of Waveguide Endface by Cutting Machine and Reinforcement Using Ruby Beads", Applied Optics, vol. 29, No. 34, Dec. 1990, pp. 5096–5102.

*Primary Examiner*—Akm E. Ullah
*Attorney, Agent, or Firm*—Cushman Darby & Cushman

[57] ABSTRACT

The present invention is directed to an optical waveguide module which is arranged to be free from a breakage of a coupling part of an optical waveguide and optical fibers which are housed in a housing and deviation of an optical axis at this coupling part even though a tensile force is applied to optical fibers. A waveguide board having an optical waveguide is housed in a housing and an optical connector to which bare optical fibers are connected is bonded to an end face of the waveguide board to form a first holding part. An optical fiber conductor and an optical fiber tape are introduced into the housing through a side wall of the housing, and the covering parts of the optical fiber conductor and an optical fiber tape are bonded to the side wall of the housing with a bonding agent to form a second holding part. The bonding strength of the second holding part is determined to be larger than the bonding strength of the first holding part.

38 Claims, 6 Drawing Sheets

OPTICAL WAVEGUIDE MODULE HAVING A WAVEGUIDE AFFIXED THERETO AT A FIRST BONDING STRENGTH AND OPTICAL FIBERS AFFIXED THERETO AT A SECOND BONDING STRENGTH

BACKGROUND OF THE INVENTION

1. Field of the Invention

The present invention relates to an optical waveguide module for use in optical fibers communications network and the like.

2. Related Art

An optical waveguide module is generally formed with a module unit which connects an end face of an optical waveguide and end faces of optical fibers and is housed in a housing sealed with nitrogen gas or the like. In this optical waveguide module, a covering member for the optical fibers is fixed to a part of the housing in order to stabilize the module unit.

Various methods for increasing the strength of a coupling part between the end faces of an optical waveguide and optical fibers have been studied. With respect to the coupling part of the optical waveguide and the optical fibers, there have been many restrictions, such as, for example, the necessity of centering the optical axis and the use of synthetic resin material having a refractive index which matches those of the optical waveguide and the optical fibers.

Figure 1:
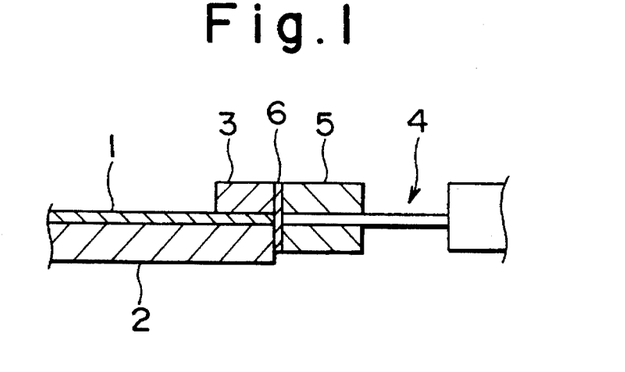
FIG. 1 is a sectional view showing a coupling arrangement of an optical waveguide and an optical fiber according to the related art.

The optical waveguide and the optical fibers may be connected in an arrangement as shown in FIG. 1 to ensure complete connection. A block 3 is mounted on an upper surface of a waveguide board 2 on which an optical waveguide 1 is formed, a connector 5 connected to the end faces of the optical fibers 4 is positioned to abut against the end face of the waveguide board 2 and the end face of the block 3 and fixed with a bonding agent.

In the arrangement shown in FIG. 1, the block 3 is mounted on the waveguide board 2 and the strength of the coupling part of the waveguide board 2 and the optical fibers 4 is increased by increasing the contact area with the connector 5. However, this method requires considerable work in aligning the block 3.

SUMMARY OF THE INVENTION

An object of the present invention is to provide an optical waveguide module which is housed in a housing and adapted so that, even when a tensile force acts on the optical fibers and this tensile force is conducted to the coupling part of the optical waveguide and the optical fibers, the deviation of the optical axis and the destruction of the coupling part may be prevented.

To realize the above-described object, it is an object of the present invention to provide an optical waveguide module comprising: a module unit having a waveguide substrate on which an optical waveguide is formed, and a fiber connector fixed on an end surface of said waveguide substrate for holding an optical fiber at an end thereof, and a housing having a guide part through which the optical fiber extends to the exterior of the housing and at which the optical fiber is fixed to the housing, the housing including the module unit. A fixing strength in a first fixing part between said optical fibers and said housing is larger than the fixing strength of a second fixing part between the end surface of said waveguide substrate and the end surface of said connector.

In the above arrangement, the bonding strength of the first fixing part is provided to be larger than that of the second fixing part and therefore, even when an external force acts on the optical fibers so as to pull the optical fibers from the housing, the external force is received by the first holding part and the coupling part of the optical waveguide and the optical fibers are free from an excessive tensile force so that the first holding part becomes strong against a mechanical tensile force.

The strength of the first holding part is further increased by applying the bonding agent both to a bare optical fiber part at the ends of an optical fiber and to a covered optical fiber part. If only the covered optical fiber part is bonded in a case that the bare optical fibers may be separated from a surrounding covering member inside the covered optical fiber part, the tensile force may be directly applied to the coupling part of the bare optical fiber part and the optical waveguide. Such trouble can be eliminated by bonding both the bare optical fiber part and the covered optical fiber part.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from reading this detailed description.

DESCRIPTION OF THE PREFERRED EMBODIMENTS

Figure 2:
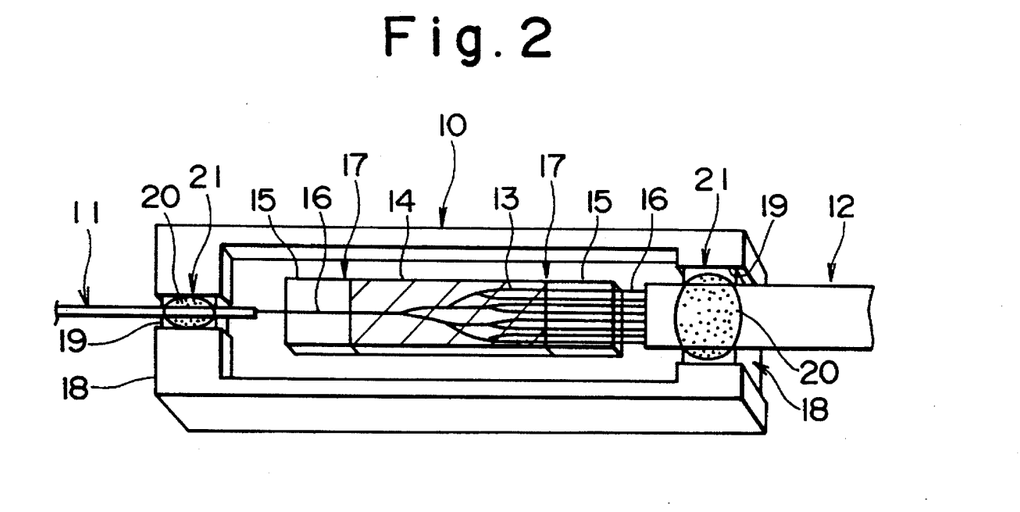
FIG. 2 is a perspective view of an optical module according to the first embodiment of the present invention.

Referring to FIG. 2, there is shown an interior of a housing 10 of an optical waveguide module according to a first embodiment of the present invention. In the first embodiment, a single-core optical fiber 11, that is, one bare optical fiber covered with a synthetic resin member, and a tape-like optical fiber cable 12 in which 8-optical fibers, that is, eight bare optical fibers are covered with the synthetic resin member are integrally coupled to an optical waveguide 13 which forms a 1×8 coupler through a connector 15 whereby a module body is formed.

Specifically, the optical waveguide 13 is formed as a 1×8 coupler by depositing a quartz glass layer on a waveguide substrate 14 made of a chip type monocrystalline silicon material by a flame deposition method. A connector 15 is fixed to both ends of the waveguide substrate 14 with a bonding agent and this fixing part of the waveguide substrate 14 and the connector 15 is formed as a first fixing part 17 which optically couples the optical waveguide 13 and the bare optical fiber 16.

An entrance side for optical signals to the optical waveguide 14 is coupled to the single optical fiber 11 through the connector 15 at the left side in FIG. 2 after alignment of optical axes. An exit side for optical signals from the optical waveguide 14 is coupled to a tape-like optical fiber cable 12 through the connector 15 at the right side in FIG. 2 after alignment of optical axes. All connectors 15 respectively have a V groove formed on the silicon chip and the bare optical fibers 16 are inserted into this V groove to form the optical waveguide and the end surface of the connector is fixed to the end surface of the waveguide substrate 14 with a bonding agent.

The above-described bonding agent for fixing the waveguide substrate 14 and the connector 15 is limited to a type which is transparent to a signal light and has a refractive index adjusted to those of the waveguide 13 and the bare optical fiber connector 16.

End surfaces of both side walls 18 of the housing 10 are formed as slight concavities 19 into which the single-optical fiber 11 and a tape-like multi-optical fiber cable 12 are placed. The optical fiber 11 and the tape-like optical fiber cable 12 are fixed to each concavity 19 to form a second holding part 21 by pouring a bonding agent into the concavity 19 along the optical fiber 11 and the tape-like optical fiber cable 12.

For coupling the connector 15 which holds the bare optical fiber 16 and the waveguide board 14, it is necessary to use an optical bonding agent which is limited in the types available for this purpose. Generally, however, this type of bonding agent only provides a weak bonding strength. A bonding area between the waveguide board 14 and the connector 15 is generally small, such as approximately b 1mm×5 mm, and the fixing strength of bonding in this case is approximately 0.5 kgf, which cannot withstand a tensile force to be actually applied to the optical fibers. (Therefore, the bonding area with the connector part has been increased by using a reinforcing block 3 as shown in FIG. 1.)

In a tension test of the optical fibers in the optical waveguide module, the evaluation is generally made in reference to a strength of 1 kgf. In handling the optical waveguide module in cases other than the tension tests, a tensile force of approximately 1 kgf may be readily applied to the optical fibers. Accordingly, a force larger than the specified strength is applied to the coupling part of the optical waveguide board 14 and the connector 15 and a breakage or an axial deviation may be caused at this coupling part.

In this embodiment, therefore, a type of bonding agent and a length of a bonding part are determined for fixing so that the strength of the second holding part 21 with which the optical fiber 11 and the tape-like optical fiber cable 12 in the housing 10 are fixed to each other is larger than the strength of the first holding part 17 with which the waveguide board 14 and the connector 15 are fixed each other. In this case, it is preferable to fix them each other so that the fixing strength in bonding of the optical fiber 11 and the tape-like optical fiber cable 12 to the housing 10 at the second fixing part 21 is 1 kgf or over.

Both the single optical fiber and the tape-like multi optical fiber cable respectively have bare optical fibers, cores, made of quartz glass at its center and outside of them are covered with a synthetic resin material, cladding so that the synthetic resin material functions as a covering layer. The covering layer is generally multi-layered and the internal layer is made of silicone or the like and the external layer is made of nylon or the like. Since the bare optical fibers and the covering layer are closely adhered, the bare optical fibers and the covering layer rarely deviate to each other in an axial direction, in other words, exfoliate from one another in the axial direction rarely occurs even when external forces acts on the bare optical fibers and the covering layer in the opposite axial directions. However, if an excessive external force acts on them, the bare optical fibers may deviate from the covering layer.

In the first embodiment, the covering part of the optical fiber is fixed to the housing with the bonding agent. But if the fixing force by close adhesion of the covering part to the bare optical fibers is smaller than the fixing force caused by bonding of the covering part to the housing, fixture between the waveguide board and the connectors can be protected from the external force. On the contrary, when the fixing force by close adhesion of the covering part to the bare optical fibers is small, it is effective to fix not only the covering part but also the bare optical fibers to the housing with the bonding agent. In general, a fixing force between the bare optical fibers and the bonding agent is larger than that between the covering part and the bonding agent.

Table 1 shows three types of bonding agents A, B and C and a bonding force between the optical fibers and the optical fiber covering part. Bonding agent A is 3052C manufactured by THREE BOND INC., bonding agent B is 3057B manufactured by THREE BOND INC., and bonding agent C is LCR0628A manufactured by TOA GOSEI CO., LTD.

TABLE 1

| | Adhesion of Bonding Agents | | |
|---|---|---|---|
| | Bonding agent A | Bonding agent B | Bonding agent C |
| Adhesion to the fiber covering part (kg/mm) | 0.13 | 0.07 | 0.11 |
| Adhesion to quartz optical fibers (kg/mm) | 0.36 | 0.12 | 0.28 |

In a case of using, for example, the bonding agent A shown in Table 1, the bonding part of the housing 10 and the optical fibers 16 can withstand a tensile force of 1 kgf by setting the application length of the bonding agent between the housing 10 and the optical fibers to be 8 mm. In addition, it is preferable that the Young's modulus of the bonding agent is over 50 kg/mm$^2$ to prevent an excessive stress from being applied to the coupling part of the optical waveguide substrate 14 and the connectors 15.

Figure 3:
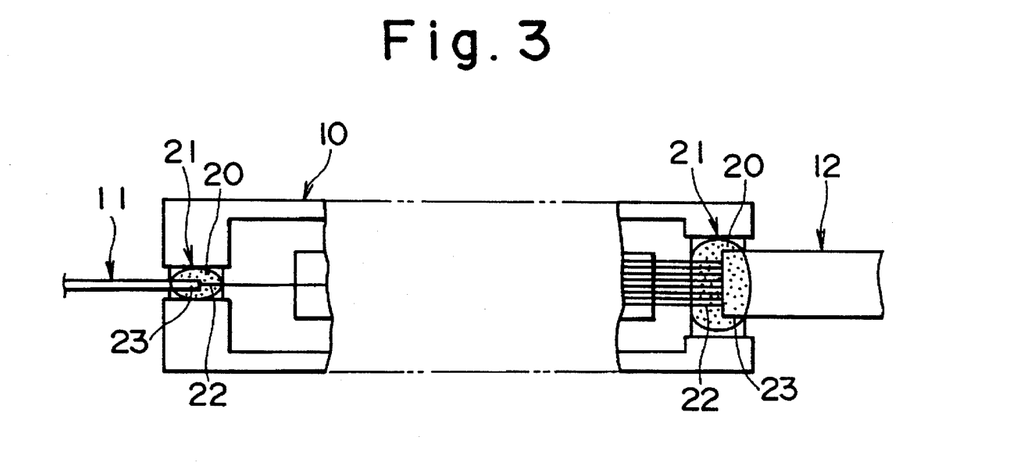
FIG. 3 is a partial plan view of the optical module according to the second embodiment.

FIG. 3 shows a second embodiment. In this second embodiment, the covering member of the optical fiber 11 or the tape-like optical fiber cable 12 is partly removed in the second fixing part 21.

According to the second embodiment, both the bare optical fiber part 22 and the covering member part 23 are connected with the bonding agent 20 and therefore even when an external force is applied to the bare optical fibers 16 and the covering member is separated from the bare optical fibers 16 in the covering part including the optical fiber 11 and the optical fiber tape 12 therein, the external force does not act on the coupling part of the connector 15 by which the bare optical fibers 16 are held and the optical waveguide 14 in the housing 10.

In the second embodiment, in most cases, the adhesion of the bonding agent for quartz glass which is a material of the bare optical fibers is larger than that for nylon which is a material of the optical fiber covering member and therefore the optical fibers can be more firmly coupled to the housing 10. In addition, the optical waveguide module can be made compact by reducing the length of the second fixing part 21. In a case of using, for example, the bonding agent A shown in Table 1, the above-described coupling part can withstand a tensile force of 1 kgf if a length along which the bonding agent is applied is set to approximately 2.2 mm by removing the optical fiber covering member as much as 2 mm.

Figure 4:
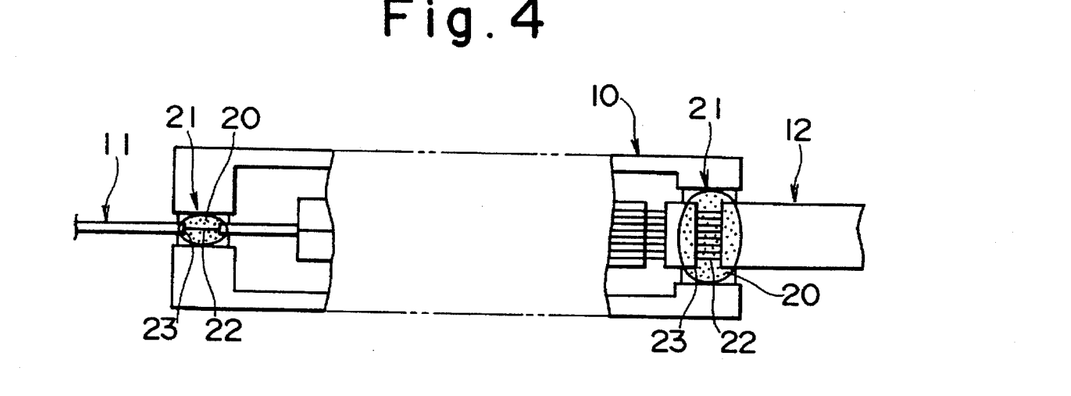
FIG. 4 is a partial plan view of the optical module according to the third embodiment.

FIG. 4 shows a third embodiment. In this third embodiment, the optical fiber covering member is partly removed from the end parts of the optical fiber conductor 11 and the optical fiber tape 12 to expose the bare optical fiber part 22, and the bare optical fiber part 22 and the covering part 23 at both ends of the bare optical fiber part 22 are fixed to the housing 10 with the bonding agent 20.

According to the third embodiment, as the second embodiment, even though an external force is applied to the bare optical fibers 16 and exfoliation occurs between the bare optical fibers 16 and the covering member in the optical fiber 11 and the tape-like optical fiber cable 12, the external force does not act on the coupling part of the connector 15, which holds the bare optical fibers 16, and the optical waveguide substrate 14 in the housing 10 and therefore the bare optical fibers 16 will not be broken.

Figure 5:
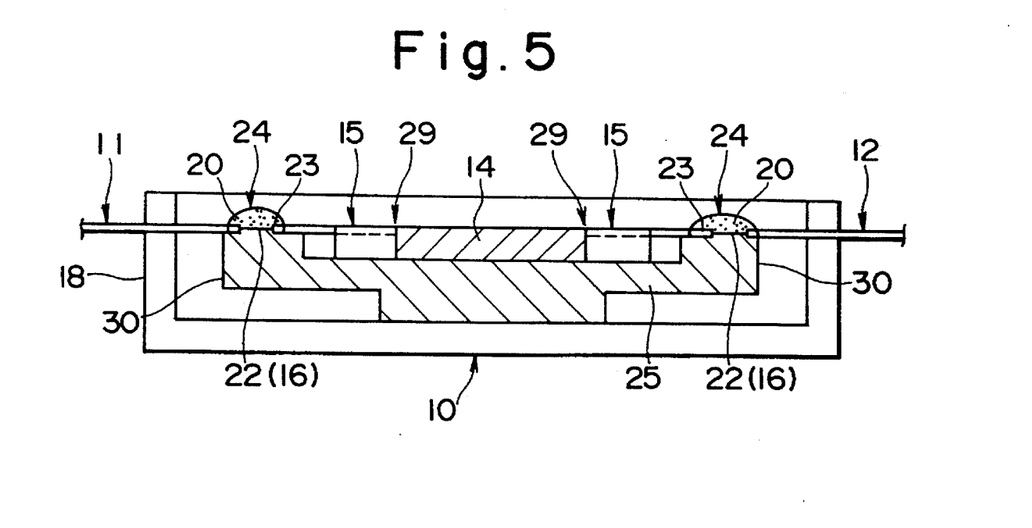
FIG. 5 is a partial plan view of the optical module according to the fourth embodiment.

FIG. 5 shows a fourth embodiment. In the fourth embodiment, there is shown an example of the second fixing part 24 provided in the housing 10. A support block 25 is provided in the housing 10 and the waveguide substrate 14 is mounted at the center of the upper surface of this support block 25. Two connectors 15 are arranged at both sides of the waveguide board 14 and fixed to both end faces of the waveguide board 14 with the bonding agent to form the first fixing part 29.

Figure 6:
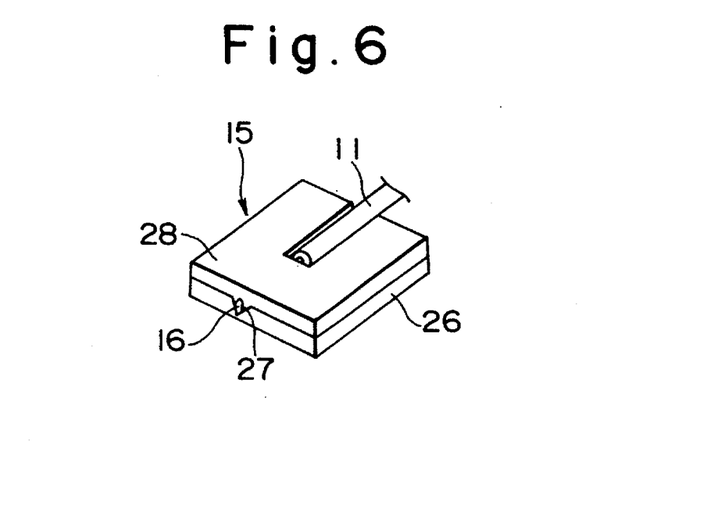
FIG. 6 is a perspective view of a connector shown in FIG. 5.

The left side connector 15 shown in FIG. 5 has a construction as shown in FIG. 6. Specifically, the optical fiber 11 is guided onto the upper surface of the silicon chip 26, the bare optical fibers 16 are fitted into a V groove 27 formed at the front end face of this silicon chip, and a holding plate 28 is bonded to the upper surface of the silicon chip. The right side connector 15 shown in FIG. 5 has a construction similar to that of the left side connector 15 and the bare optical fibers 16 of the optical fiber conductor 12 are respectively fitted into a plurality of V grooves.

Both end parts of the support block 25 respectively serve as a rise part 30. The optical fiber conductor 11, the bare optical fiber part 22 from which the cover of the tape-like optical fiber cable 12 is partly removed, and the covering parts 23 located at both ends of this bare optical fiber part 22 are mounted on the upper surface of each rise part 30, and the outside of this assembly is covered with the bonding agent 20 to form the second fixing part 24.

The optical fiber conductor 11 and the tape-like optical fiber cable 12 are guided out through the side wall 18 of the housing 10. In this fourth embodiment, the bonding strength in the second fixing part 24 is larger than that of the first fixing part 29 formed in the bonding between the waveguide board 14 and the connector 15.

According to the fourth embodiment as other embodiments, even though an external force is applied to the bare optical fibers 16 and exfoliation occurs between the bare optical fibers 16 and the covering member 23 in the optical fiber conductor 11 and the optical fiber tape 12, the external force does not act on the coupling part of the connector 15, which fixes the bare optical fibers 16, and the optical waveguide board 14 and therefore the first fixing part 29 will not be broken.

In the fourth embodiment, the support block 25 is independent of the housing 10 to facilitate assembly work of the optical waveguide module. Accordingly, the support block 25 can be fixed to the housing 10.

Since the present invention relates to the construction for installation of the optical waveguide module, the optical wave guide is not limited to quartz-based materials and can be made of materials for semiconductors and heavy-duty dielectric materials. In addition, the connector 15 serving as the first fixing part can be made as a chip made from various types of materials such as glass, in addition to a silicon chip. Materials for forming the housing 10 and the second holding parts 21 and 24 can be aluminum, SUS, plastics or the like, which satisfy environmental requirements for the optical waveguide module.

In the case of the optical waveguide module according to the above-described embodiments, even if an external mechanical tensile force acts on the optical fibers, this external force does not affect the coupling part of the optical waveguide and the optical fibers housed in the housing since the bonding strength at the fixing part of the housing and the optical fibers is determined to be larger than the bonding strength at the coupling part of the optical waveguide and the optical fibers. Therefore, the coupling part can be made to be free from damage, breakage and axial deviation, and the optical waveguide module according to the present invention can effectively apply to optical waveguide module packages to be applied in optical fiber communications services.

The optical waveguide module according to the present invention is described below in more detail.

Figure 7:
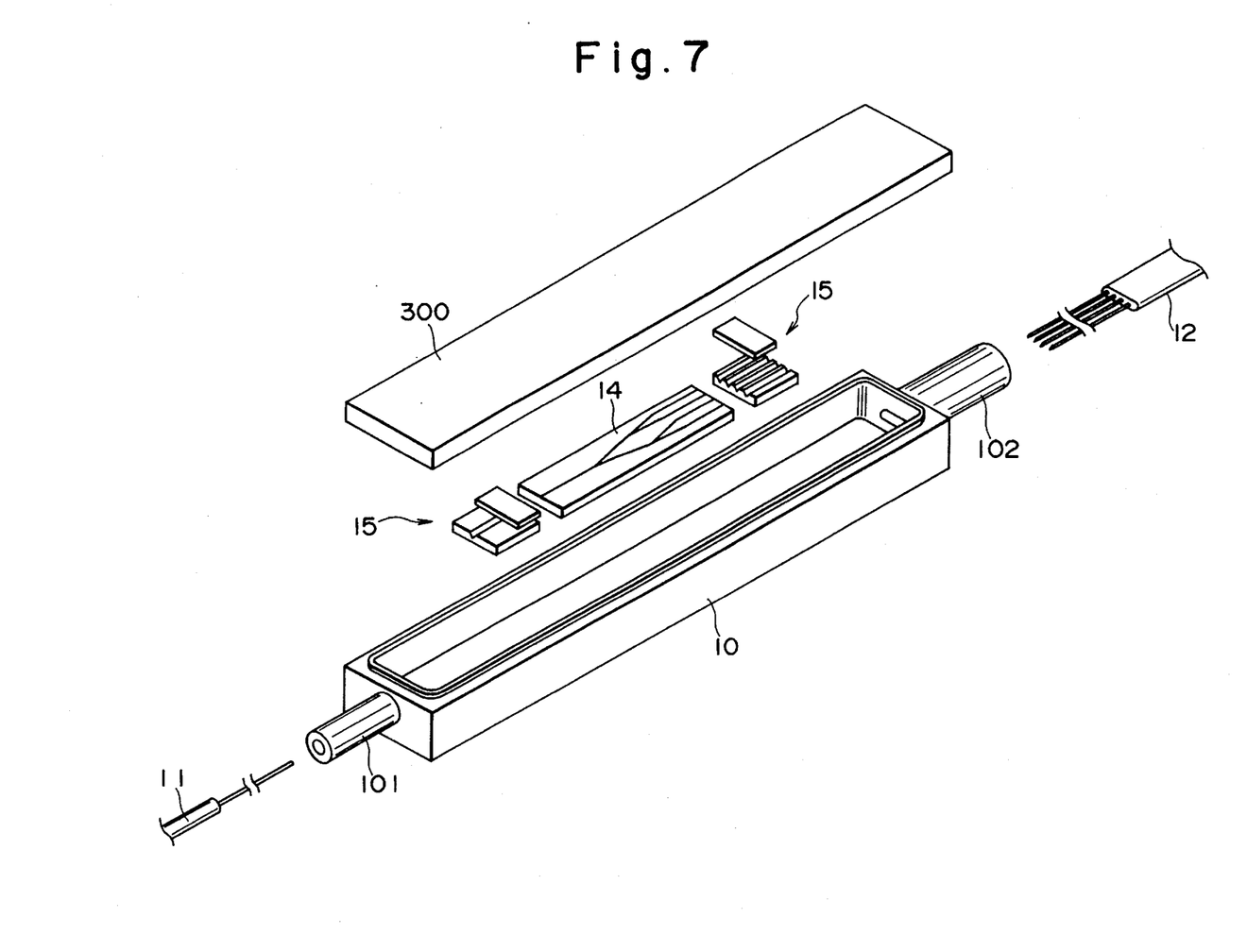
FIG. 7 is a disassembled perspective view of the optical module according to the fifth embodiment.
Figure 8:
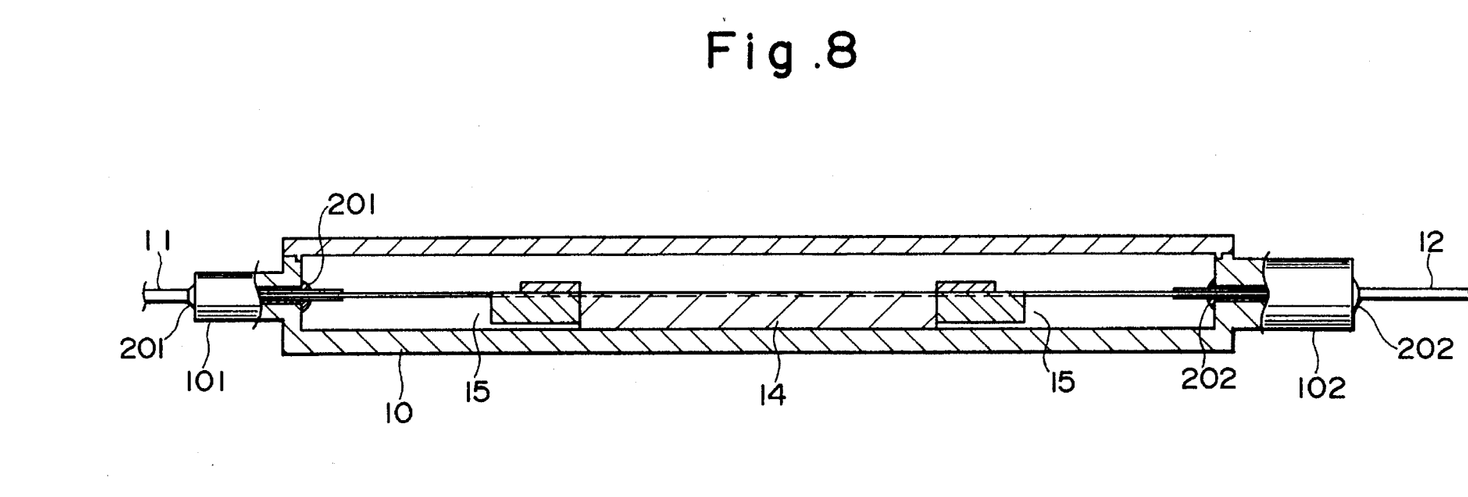
FIG. 8 is a vertical sectional view of a completed optical module according to the fifth embodiment.

As shown in FIGS. 7 and 8, the housing 10 made of aluminum is a long box, one end of which is provided with a tubular guide part 101 in which a circular hole is formed as a through hole and the other end of which is provided with a tubular guide part 102 in which a flat hole is formed also as a through hole. A single-optical fiber conductor 11 is passed through a circular hole of a guide part 101 and fixed thereto with a bonding agent 201, and a multi-core optical fiber tape 12 is passed through a flat hole of a guide-out part 102 and fixed thereto with a bonding agent 202. In this case, the bonding agents 201 and 202 to be used are preferably such that the ratio of water absorption is small, shrinkage due to hardening is also small and a coefficient of thermal expansion is likewise small and, more particularly, the bonding agents are of a thermosetting type which can be hardened at a low temperature within a short period of time. The thermosetting type bonding agent is suitable for its high bonding force; for example, STAYCAST 2057 manufactured by GRACE JAPAN CO., LTD and EPO-TEC 302-3 manufactured by RIKEI CO., LTD can be used.

Bonding with the bonding agents 201 and 202 can be done only on the external nylon cover or the internal cover such as silicone resin, or both covers can be bonded to the through holes of the guide-out parts 101 and 102. In addition, the bonding strength can be increased by bonding these covers and the bare optical fibers simultaneously to the through holes, respectively.

The waveguide board 14 is housed in the housing 10 and bonded in advance to the connector 15 which fixes optical fibers (bare optical fibers). The connector 15 comprises a silicon chip provided with V grooves and a holding plate and is bonded to hold bare optical fibers therein. In this case, a bonding agent with less shrinkage caused due to hardening and a small coefficient of thermal expansion is selected for bonding the connector 15 and the waveguide substrate 14 at their end faces. A bonding agent which is hardened either by irradiation of an ultraviolet ray or by heating is preferable. Bonding of the waveguide board 14 and the connector 15 can be implemented more completely by temporarily fixing the waveguide substrate 14 and the connector 15 with irradiation of the ultraviolet ray, then fixing optical fibers 11 and 12 to the housing 10 with a thermosetting type bonding agent. Moreover, the refractive index $N_1$ of the bonding agent for fixing the waveguide board 14 and the connector 15 is preferably as given below, where the refractive index of the optical waveguide is $N_0$ and the refractive index of the core of optical fiber is $N_2$:

$$N_1 = (N_0 \cdot N_2)^{1/2}$$

This is for reducing the loss of transmitting light at the bonded part. In view of the above, the following bonding agents are used to fix the waveguide board 14 and the connector 15; for example, an ultraviolet hardening type bonding agent UV-2100 manufactured by DAIKIN KOGYO CO., LTD., an ultraviolet hardening type bonding agent LCR0277 manufactured by TOA GOSEI CO., LTD. and LCR10026/65A to which a UV catalyst and a heat catalyst are added are used.

As shown in FIGS. 7 and 8, the module unit is built in the housing 10 and the internal chamber is sealed by a cover 300. This cover 300 can be fixed by welding or by a bonding agent. An inactive gas such as nitrogen is sealed in the housing 10. In this case, though the waveguide board 14 can be bonded to the bottom of the housing 10, these parts are bonded only at their partial surfaces and not at their full surfaces. If the overall surfaces of these parts are bonded, exfoliation is prone to occur due to thermal shrinkage.

Figure 9:
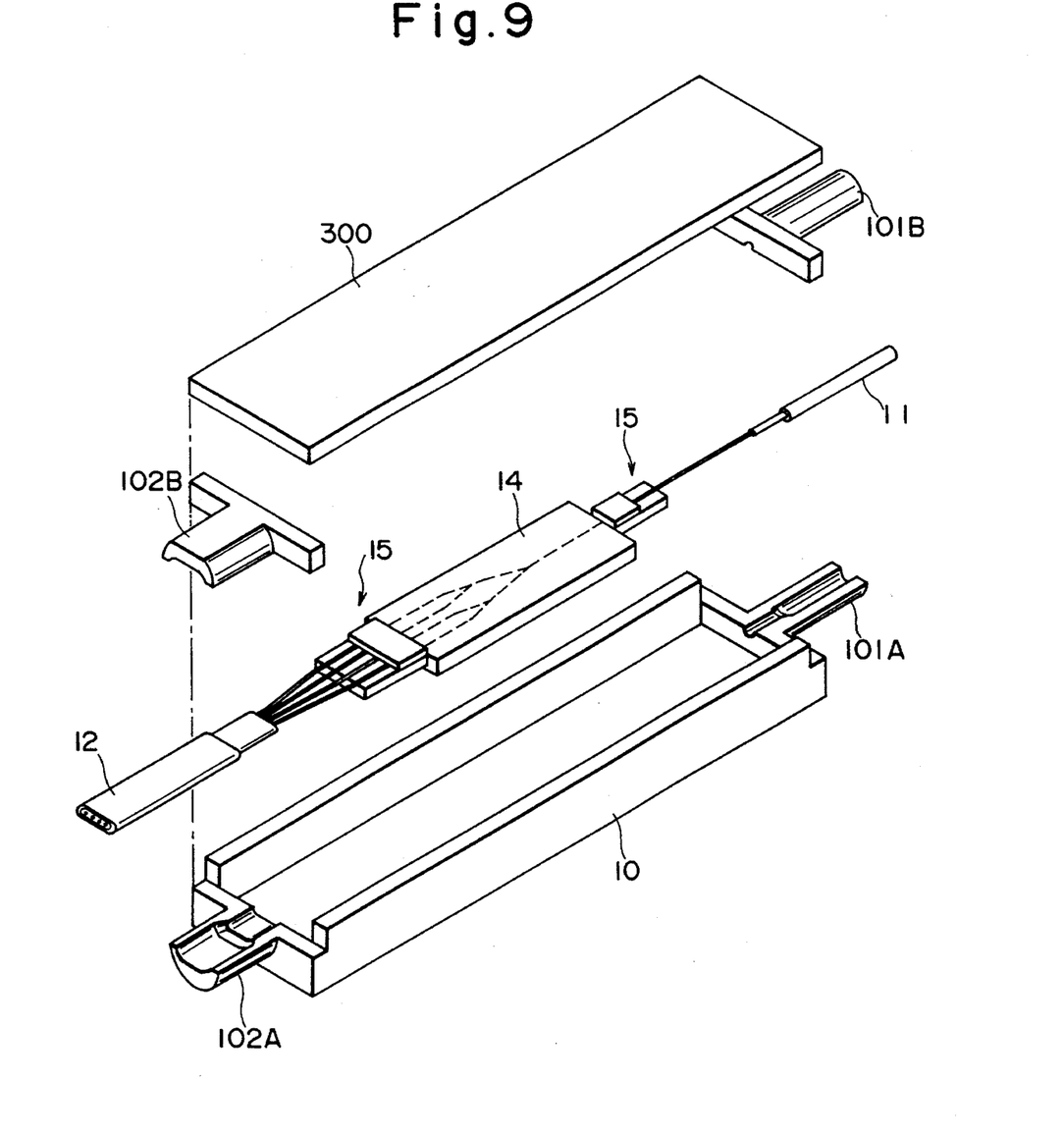
FIG. 9 is a disassembled perspective view of the optical module according to the sixth embodiment.
Figure 10:
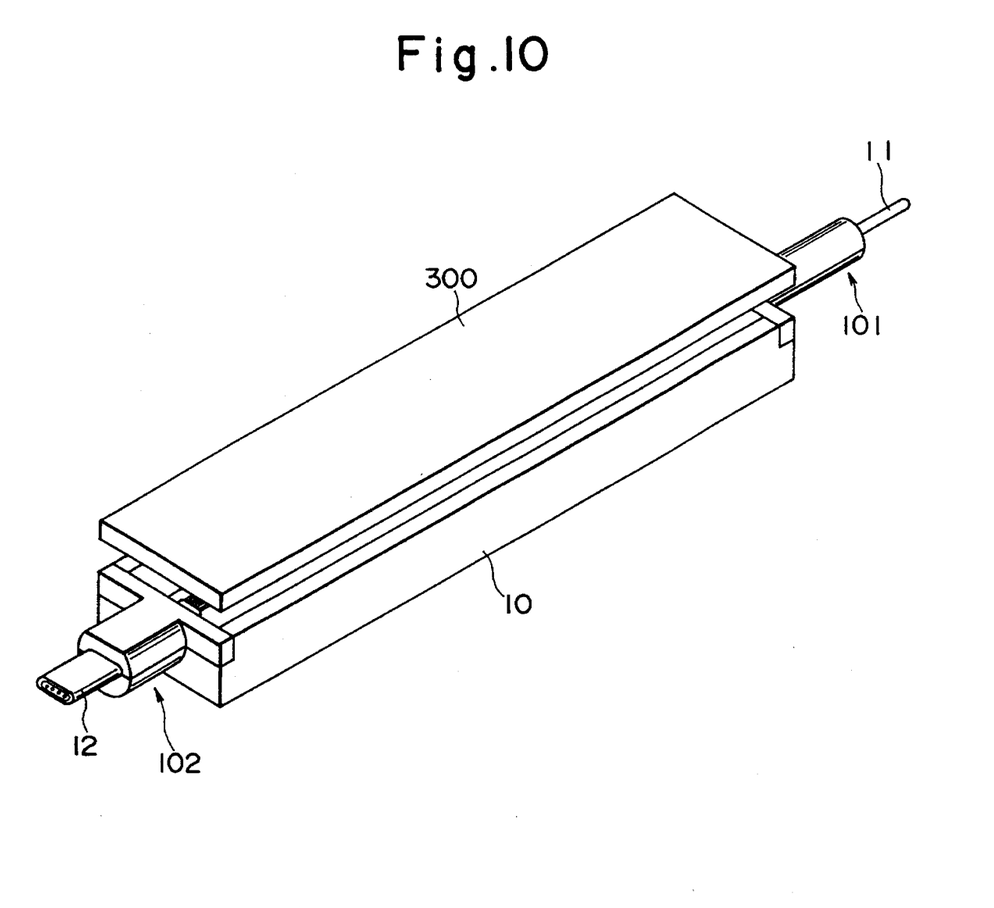
FIG. 10 is a perspective view of the optical module according to the sixth embodiment shortly before the cover is fixed.

In the embodiment shown in FIGS. 9 and 10, the housing 10 and the cover 300 are made of polycarbonate. The guide parts 101 and 102 for holding optical fibers are respectively composed of lower parts 101A and 102A which are integral with the housing 10 and separate upper parts 101B and 102B. In this embodiment, the external and internal covering members at the end parts of the optical fiber conductors 11 and 12 are removed to expose bare optical fibers. The end parts of bare optical fibers are held by the connector 15 and treated with a bonding agent, and the end faces are ground. After this, the connector 15 is bonded to both end faces of the waveguide board 14 and this assembly is set in the housing 10. Then the upper parts 101B and 102B of the guide parts 101 and 102 are set and the optical fiber conductor is fixed with the bonding agent. The housing 10 is filled with an inactive gas. Thus the optical waveguide module is completed.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An optical waveguide module comprising:
    a module unit including:
        a waveguide substrate on which an optical waveguide is formed; and
        a fiber connector fixed on an end surface of said waveguide substrate for holding an optical fiber at an end surface thereof;
    a housing having a guide part through which the optical fiber is led to an exterior of said housing, said fiber being fixed to said housing at said guide part, said housing accommodating said module unit,
    a first bonding agent for fixing said optical fiber to said housing to thereby form a first fixing part between said optical fiber and said housing; and
    a second bonding agent for fixing the end surface of said waveguide substrate to the end surface of said fiber connector to thereby form a second fixing part between the end surface of said waveguide substrate and the end surface of said fiber connector;
    wherein a fixing strength of said bonding agent in said first fixing part is larger than the fixing strength of said second bonding agent in said second fixing part.

2. An optical waveguide module according to claim 1, wherein said optical fiber includes a bare optical fiber and a covering member covering said bare optical fiber, wherein said first fixing part is formed by fixing said covering member of said optical fibers to said housing with said first bonding agent.

3. An optical waveguide module according to claim 1, wherein said optical fiber is a tape type optical fiber formed of a plurality of bare optical fibers arrayed in parallel covered by said covering member.

4. An optical waveguide module according to claim 1, wherein said fiber connector includes a substrate on which a groove with a V-shaped section for holding said optical fiber is provided therein.

5. An optical waveguide module according to claim 1, wherein said guide part of said housing includes a wall with an aperture defined therein through which said optical fiber extends.

6. An optical waveguide module according to claim 1, wherein said housing further comprises a cover for closing an opening of said housing, said cover being fixed to said housing to thereby seal an internal space within said housing.

7. An optical waveguide module according to claim 6, wherein said sealed space formed by said housing and said cover is filled and sealed with an inactive gas.

8. An optical waveguide module according to claim 1, wherein said second bonding agent is an ultraviolet ray hardening type agent and said first bonding agent is a thermosetting type agent.

9. An optical waveguide module comprising:
    a module unit having;
        a waveguide substrate on which an optical waveguide is formed; and
        a fiber connector fixed on an end surface of said waveguide substrate for holding an optical fiber at an end surface thereof;
    a housing having a guide portion communicating with an exterior of said housing, said fiber passing through said guide portion through to said exterior of said housing, said optical fiber being fixed to said guide portion of said housing, said housing accommodating said module unit;

a first bonding agent fixing said optical fiber to said housing to form a first fixing part between said optical fiber and said housing; and a second bonding agent fixing the end surface of said waveguide substrate to the end surface of said fiber connector, thus forming a second fixing part between the end surface of said waveguide substrate and the end surface of said fiber connector;

wherein said optical fiber including a bare optical fiber and a covering member covering said bare optical fiber with a part of said covering member being removed from said bare optical fiber to thereby expose a predetermined length of said bare optical fiber, said predetermined length being disposed at an end of said optical fiber;

wherein the exposed bare optical fiber and a part of said covering member, being fixed to said housing with said first bonding agent to form said first fixing part; and wherein a fixing strength of said first bonding agent in said first fixing part is larger than the fixing strength of said second bonding agent in said second fixing part.

10. An optical waveguide module according to claim 9, wherein said optical fiber is a tape type optical fiber comprising a plurality of bare optical fibers arrayed in parallel covered by said covering member.

11. An optical waveguide module according to claim 9, wherein said fiber connector includes a substrate having a groove with a V-shaped cross-section for holding said optical fiber provided therein.

12. An optical waveguide module according to claim 9, wherein said guide portion of said housing includes a wall defining an aperture through which said optical fiber passes.

13. An optical waveguide module according to claim 9, wherein said housing further comprises a cover for closing an opening of said housing, said cover being fixed to said housing so as to seal an internal space of the housing.

14. An optical waveguide module according to claim 13, wherein said internal space is filled with an inactive gas.

15. An optical waveguide module according to claim 9, wherein said second bonding agent is one of an ultraviolet ray hardening type agent and a thermosetting type agent, and said first bonding agent is a thermosetting type agent.

16. An optical waveguide module comprising:

a module unit having;
  a waveguide substrate on which an optical waveguide is formed; and
  a fiber connector fixed on an end surface of said waveguide substrate for holding an optical fiber at an end surface thereof;

a housing having a guide portion through which the optical fiber extends, said guide portion communicating between an internal space of said housing and an external space surrounding said housing, said optical fiber bars fixed to said guide portion, said housing accommodating said module unit;

a first bonding agent fixing said optical fiber to said housing to form a first fixing part between said optical fiber and said housing; and a second bonding agent fixing the end surface of said waveguide substrate to the end surface of said fiber connector, thus forming a second fixing part between the end surface of said waveguide substrate and the end surface of said fiber connector;

wherein said optical fiber includes a bare optical fiber and a covering member covering said bare optical fiber, a part of said covering member being removed from said bare optical fiber for a predetermined distance from an end of said optical fiber;

wherein said core and a section of the cladding adjacent to the exposed core being fixed to said housing via said first bonding agent to thereby form said first fixing part;

wherein a fixing strength of said first bonding agent is larger than a fixing strength of said second bonding agent.

17. An optical waveguide module according to claim 16, wherein said optical fiber is a tape type optical fiber including a plurality of bare optical fibers arrayed in parallel covered by said covering member.

18. An optical waveguide module according to claim 16, wherein said fiber connector includes a substrate having a groove with a V-shaped cross-section for holding said optical fiber provided therein.

19. An optical waveguide module according to claim 16, wherein said guide portion includes a wall defining an aperture therein through which said optical fiber passes.

20. An optical waveguide module according to claim 16, wherein said housing further comprises a cover for closing an opening of said housing, said cover being fixed to said housing to seal said internal space.

21. An optical waveguide module according to claim 20, wherein said internal space is filled with an inactive gas.

22. An optical waveguide module according to claim 16, wherein said second bonding agent is one of an ultraviolet ray hardening type agent and a thermosetting agent, and said first bonding agent is a thermosetting type agent.

23. An optical waveguide module comprising:

a module unit having;
  a waveguide substrate on which an optical waveguide is formed; and
  a fiber connector fixed on an end surface of said waveguide substrate for holding an optical fiber at an end surface thereof;

a support block for mounting said module unit, said optical fiber being fixed to an end surface of said support block;

a housing having a guide portion through which said optical fiber extends to an exterior of said housing, said housing accommodating said module unit and said support block;

a first bonding agent fixing said optical fiber to the end surface of said support block, thereby forming a first fixing part between said optical fiber and said support block; and a second bonding agent fixing the end surface of said waveguide substrate to the end of said fiber connector, thereby forming a second fixing part between the end surface of said waveguide substrate and the end surface of said fiber connector;

wherein said optical fiber includes a bare optical fiber and a covering member covering said bare optical fiber, a part of said covering member being removed from said bare optical fiber for a predetermined distance from an end of said optical fiber;

wherein the exposed bare optical fiber and a part of the covering member adjacent to the exposed bare optical fiber are fixed to the end surface of said support block with said first bonding agent to thereby form said first fixing part; and wherein a fixing strength of said first bonding agent in said first fixing part being larger than the fixing strength of said second bonding agent in said second fixing part.

24. An optical waveguide module according to claim 23, wherein said support block is fixed to said housing.

25. An optical waveguide module according to claim 23, wherein said optical fiber is a tape type optical fiber including a plurality of bare optical fibers arrayed in parallel covered by said covering member.

26. An optical waveguide module according to claim 23, wherein said fiber connector includes a substrate having a groove with a V-shaped cross-section for holding said optical fiber provided therein.

27. An optical waveguide module according to claim 23, wherein said guide portion includes a wall defining an aperture therein through which said optical fiber extends.

28. An optical waveguide module according to claim 23, wherein said housing further comprises a cover for closing an opening of said housing, said cover being fixed to said housing to seal an internal space of said housing.

29. An optical waveguide module according to claim 28, wherein said internal space is filled with an inactive gas.

30. An optical waveguide module according to claim 23, wherein said second bonding agent is one of an ultraviolet ray hardening type agent and a thermosetting agent, and said first bonding agent is a thermosetting type agent.

31. An optical waveguide module comprising:
   a module unit having;
      a waveguide substrate on which an optical waveguide is formed; and
      a fiber connector fixed on an end surface of said waveguide substrate for holding an optical fiber at an end surface thereof;
   a support block for mounting said module unit, said optical fiber being fixed to an end surface of said support block;
   a housing having a guide portion through which the optical fiber extends, said guide portion communicating an internal space of said housing with an exterior space surrounding said housing, said housing accommodating said module unit and said support block;
   a first bonding agent fixing said optical fiber to the end surface of said support block to form a first fixing part between said optical fiber and said support block; and
   a second bonding agent fixing the end surface of said waveguide substrate to the end surface of said fiber connector to form a second fixing part between the end surface of said waveguide substrate and the end surface of said fiber connector;
   wherein said optical fiber includes a bare optical fiber and a covering member covering the bare optical fiber, a part of the covering member being removed from said bare optical fiber to expose the bare optical fiber for a predetermined length at an end of said optical fiber;
   wherein the exposed bare optical fiber and the covering member are fixed to the end surface of said support block with said first bonding agent to form said first fixing part;
   wherein a fixing strength of said first bonding agent in said first fixing part is larger than a fixing strength of said second bonding agent in said second fixing part.

32. An optical waveguide module according to claim 31, wherein said support block is fixed to said housing.

33. An optical waveguide module according to claim 31, wherein said optical fiber is a tape type optical fiber comprising a plurality of bare optical fibers arrayed in parallel covered by said covering member.

34. An optical waveguide module according to claim 31, wherein said fiber connector includes a substrate having a groove with a V-shaped cross-section for holding said optical fiber provided therein.

35. An optical waveguide module according to claim 31, wherein said guide portion includes a wall defining an aperture through which said optical fiber extends.

36. An optical waveguide module according to claim 31, wherein said housing further comprises a cover for closing an opening of said housing, said cover being fixed to said housing to seal said internal space.

37. An optical waveguide module according to claim 36, wherein said internal space is filled with an inactive gas.

38. An optical waveguide module according to claim 31, wherein said second bonding agent is one of an ultraviolet ray hardening type agent and a thermosetting agent, and said first bonding agent is a thermosetting type agent.

* * * * *